United States Patent [19]

Fujii

[11] Patent Number: 5,500,672

[45] Date of Patent: Mar. 19, 1996

[54] MULTI-MEDIA COMMUNICATION APPARATUS FOR TRANSMITTING AUDIO INFORMATION, VIDEO INFORMATION AND CHARACTER INFORMATION SIMULTANEOUSLY

[75] Inventor: Toshiyuki Fujii, Kasuga, Japan

[73] Assignee: Matsushita Electric Industrial Co., Ltd., Osaka, Japan

[21] Appl. No.: 204,606

[22] Filed: Mar. 2, 1994

[30] Foreign Application Priority Data

Mar. 8, 1993 [JP] Japan ................................ 5-047005

[51] Int. Cl.⁶ ........................................ H04N 7/12
[52] U.S. Cl. .............................. 348/17; 348/14; 348/462
[58] Field of Search ............................. 348/14, 17, 15, 348/462, 467, 465, 428; H04N 7/12, 7/13

[56] References Cited

U.S. PATENT DOCUMENTS 5,231,492  7/1993  Dangi ...................... 348/17

FOREIGN PATENT DOCUMENTS 4129465  4/1992  Japan .
4266255  9/1992  Japan .
5167710  7/1993  Japan .

*Primary Examiner*—Victor R. Kostak
*Attorney, Agent, or Firm*—Stevens, Davis, Miller & Mosher

[57] ABSTRACT

In a multi-media communication apparatus, a frame control is provided for detecting the quantity of a compressed video signal stored in a video data buffer on the basis of information supplied from a buffer control and for changing over the compression scheme in an audio codec part and the channel allocation scheme in a multiplexing/demultiplexing part according to the detected quantity of the video signal. When the buffer control informs that the quantity of the compressed video signal stored in the video data buffer exceeds a predetermined threshold, the frame control instructs the multiplexing/demultiplexing part to decrease the audio channels and informs the audio codec part to use the corresponding audio encoding scheme. When the motion of the video signal is slowed down, and the frame control is informed from the buffer control that the quantity of the video signal stored in the video data buffer decreases, the frame control instructs the audio codec part to restore the initially set compression scheme and also instructs the multiplexing/demultiplexing part to restore the initially set frame structure.

11 Claims, 6 Drawing Sheets

FIG. 3A

1ST CHANNEL

|   | 1 | 2 | 3 | 4 | 5 | 6 | 7 | 8 |
|---|---|---|---|---|---|---|---|---|
| 1ST OCTET | $A_1$ | $A_2$ | $V_1$ | $V_2$ | $V_3$ | $V_4$ | $V_5$ | FAS |
| 8TH OCTET | $A_8$ | $A_9$ | | | | | | BAS |
| 16TH OCTET | | | | | | | | $V_{113}$ |
| ⋮ | | | | | | | $A_{559}$ | |
| 80TH OCTET | | | | | | | $A_{560}$ | $V_{680}$ |

FIG. 3B

2ND CHANNEL

|   | 1 | 2 | 3 | 4 | 5 | 6 | 7 | 8 |
|---|---|---|---|---|---|---|---|---|
| 1ST OCTET | $V_1$ | $V_2$ | $V_3$ | $V_4$ | $V_5$ | $V_6$ | $V_7$ | FAS |
| 8TH OCTET | | | | | | | | BAS |
| 16TH OCTET | $V_{114}$ | | | | | | $V_{112}$ | $V_{121}$ |
| ⋮ | | | | | | | $V_{120}$ | |
| 80TH OCTET | $V_{681}$ | | | | | | $V_{687}$ | $V_{688}$ |

FRAME STRUCTURE AT AUDIO SIGNAL COMMUNICATION RATE OF 56 kbps

An: AUDIO SIGNAL
Vn: VIDEO SIGNAL
FAS: FRAME ALIGNMENT SIGNAL
BAS: BIT-RATE ALLOCATION SIGNAL

FIG. 4A

1ST CHANNEL

| | 1 | 2 | 3 | 4 | 5 | 6 | 7 | 8 | |
|---|---|---|---|---|---|---|---|---|---|
| 1ST OCTET | $A_1$ | $A_2$ | $A_3$ | $A_4$ | $A_5$ | $A_6$ | $V_1$ | FAS | |
| 8TH OCTET | $A_7$ | $A_8$ | | | | | $V_9$ | BAS | |
| | | | | | | | $V_{121}$ | $V_{130}$ | |
| 16TH OCTET | | | | | | | $V_{129}$ | . | |
| | . | . | . | . | . | . | . | . | |
| 80TH OCTET | $A_{475}$ | $A_{476}$ | $A_{477}$ | | | $A_{480}$ | $V_{259}$ | $V_{760}$ | |

FIG. 4B

2ND CHANNEL

| | 1 | 2 | 3 | 4 | 5 | 6 | 7 | 8 | |
|---|---|---|---|---|---|---|---|---|---|
| 1ST OCTET | $V_2$ | $V_3$ | $V_4$ | $V_5$ | $V_6$ | $V_7$ | $V_8$ | FAS | |
| 8TH OCTET | $V_{10}$ | $V_{11}$ | | | | | . | BAS | |
| | | | | | | | $V_{128}$ | V | |
| 16TH OCTET | $V_{131}$ | . | | | | | V | | |
| | . | . | . | . | . | . | . | . | |
| 80TH OCTET | $V_{761}$ | | | | | | $V_{767}$ | $V_{768}$ | |

FRAME STRUCTURE AT AUDIO SIGNAL
COMMUNICATION RATE OF 48kbps

An: AUDIO SIGNAL
Vn: VIDEO SIGNAL
FAS: FRAME ALIGNMENT SIGNAL
BAS: BIT-RATE ALLOCATION SIGNAL

FIG. 5A

1ST CHANNEL

| | 1 | 2 | 3 | 4 | 5 | 6 | 7 | 8 | |
|---|---|---|---|---|---|---|---|---|---|
| | $A_1$ | $A_2$ | $V_1$ | $V_2$ | $V_3$ | $V_4$ | $V_5$ | FAS | 1ST OCTET |
| | $A_3$ | $A_4$ | $V_{13}$ | $V_{14}$ | | | | BAS | 8TH OCTET |
| | | | $V_{25}$ | | | | | $V_{198}$ | 16TH OCTET |
| | . | . | $V_{193}$ | . | . | . | . | . | |
| | . | . | . | . | . | . | . | . | |
| | . | . | . | . | . | . | . | . | |
| | . | . | . | . | . | . | . | . | |
| | $A_{159}$ | $A_{160}$ | $V_{1075}$ | . | . | . | . | $V_{1080}$ | 80TH OCTET |

FIG. 5B

2ND CHANNEL

| | 1 | 2 | 3 | 4 | 5 | 6 | 7 | 8 | |
|---|---|---|---|---|---|---|---|---|---|
| | $V_6$ | $V_7$ | $V_8$ | $V_9$ | $V_{10}$ | $V_{11}$ | $V_{12}$ | FAS | 1ST OCTET |
| | | | | | | | | BAS | 8TH OCTET |
| | | | | | | | $V_{192}$ | $V_{206}$ | 16TH OCTET |
| | $V_{99}$ | . | . | . | . | . | $V_{200}$ | . | |
| | . | . | . | . | . | . | . | . | |
| | . | . | . | . | . | . | . | . | |
| | . | . | . | . | . | . | . | . | |
| | $V_{1081}$ | . | . | . | . | . | $V_{1087}$ | $V_{1088}$ | 80TH OCTET |

FRAME STRUCTURE AT AUDIO SIGNAL
COMMUNICATION RATE OF 16 kbps

An: AUDIO SIGNAL
Vn: VIDEO SIGNAL
FAS: FRAME ALIGNMENT SIGNAL
BAS: BIT-RATE ALLOCATION SIGNAL

MULTI-MEDIA COMMUNICATION APPARATUS FOR TRANSMITTING AUDIO INFORMATION, VIDEO INFORMATION AND CHARACTER INFORMATION SIMULTANEOUSLY

BACKGROUND OF THE INVENTION

1. Field of the Invention

This invention relates to a multi-media communication apparatus in which information of a plurality of media including video information (time-varying moving picture information and still picture information), audio information and character information are combined by multiplexing to be transmitted to another multi-media communication apparatus.

2. Description of the Related Art

In a prior art manner of multi-media communication of information including video information, audio information and character information, the user of a conventional multi-media communication apparatus desiring to make communication with another conventional multi-media communication apparatus selected the telephone number of the latter multi-media communication apparatus on a key manipulator part, and, when the user manipulated keys for dialing the telephone number, a call control/processing part of the former multi-media communication apparatus acted to connect the former and latter multi-media communication apparatuses to the communication line through a line interface part. Then, the user of the multi-media communication apparatus inputted the communication rate of audio information on the key manipulator part according to the paragraph H. 221 of the CCITT recommendations thereby determining the channel allocated to the communication line and the frame structure of information including audio information, video information and data information on the basis of the inputted audio signal communication rate. Then, according to the BAS Code (bit-rate allocation signal) defined in the paragraph H. 241 of the CCITT recommendations, the frame structure and multi-media communication capacity were exchanged between the former and latter multi-media communication apparatuses, and the communication mode, etc. between the multi-media communication apparatuses were specified.

As described above, in the case of the prior art multi-media communication apparatuses, the multi-media communication of information including video information, audio information and data information was started after setting of the end-to-end physical connections of initial and additional channels and establishment of the in-channel frame alignment between the apparatuses.

However, when the video information was detected to include incessant scene changes or very fast motion, the density of the video information was made lower by decreasing the number of frames or changing, for example, the parameter of quantization in the quantizing step. Thus, it was the prior art practice that the desired multi-media communication was achieved by multiplexing information including audio information, video information and character information in the manner described above.

SUMMARY OF THE INVENTION

It is an object of the present invention to provide a multi-media communication apparatus in which, even when a video input signal includes incessant scene changes or very fast motion, occurrence of undesirable frame drop-out or block distortion of video data can be minimized.

An embodiment of the multi-media communication apparatus according to the present invention comprises a line interface part controlling communication through a communication line, a call control/processing part controlling calls incoming or outgoing through the line interface part, a multiplexing/demultiplexing part multiplexing video information and audio information supplied from a terminal unit connected thereto to transmit the multiplexed information through the line interface part and demultiplexing a signal received through the line interface part into video information and audio information, a terminal control part managing and controlling the call control/processing part and the multiplexing/demultiplexing part in response to an instruction input, an audio codec part encoding an audio signal to transmit the encoded audio signal to the multiplexing/demultiplexing part and decoding an audio signal received from the multiplexing/demultiplexing part to reproduce audio information, moving picture data encoding/decoding part encoding and decoding a video signal, a video data buffer temporarily storing a video signal compressed in the moving picture data encoding/decoding part and a received video signal separated by the multiplexing/demultiplexing part and transmitting the compressed video signal to the multiplexing/demultiplexing part and the separated video signal to the moving picture data encoding/decoding part, a buffer control part changing over the scheme of compression in the moving picture data encoding/decoding part according to the quantity of the video signal stored in the video data buffer and the communication rate allocated to the video signal in the multiplexing/demultiplexing part so that the video signal stored in the video data buffer to be transmitted may not overflow from the video data buffer, and a frame control part detecting the quantity of the stored compressed video signal on the basis of the information supplied from the buffer control part thereby controlling the change-over of the compression scheme in the audio codec part and the channel allocation scheme in the multiplexing/demultiplexing part according to the detected quantity of the video signal.

Thus, when, in the multi-media communication apparatus having the structure described above, the buffer control part informs that the quantity of the compressed or encoded video signal is larger than a threshold, the frame control part instructs the multiplexing/demultiplexing part to decrease the number of audio channels to be allocated and informs the audio codec part to use the audio encoding scheme corresponding to the channel allocation scheme, so that occurrence of undesirable frame drop-out attributable to very fast motion of pictures and also undesirable block distortion attributable to mosaic changes of scenes can be minimized.

BRIEF DESCRIPTION OF THE DRAWINGS

FIGS. 3A and 3B schematically show one form of the frame structure used in the illustrated embodiment of the multi-media communication apparatus of the present invention when the audio signal communication rate is 56 kbps.

FIGS. 4A and 4B schematically show another form of the frame structure used in the illustrated embodiment of the multi-media communication apparatus of the present invention when the audio signal communication rate is 48 kbps.

FIGS. 5A and 5B schematically show another form of the frame structure used in the illustrated embodiment of the multi-media communication apparatus of the present invention when the audio signal communication rate is 16 kbps.

DESCRIPTION OF THE PREFERRED EMBODIMENTS

Figure 1:
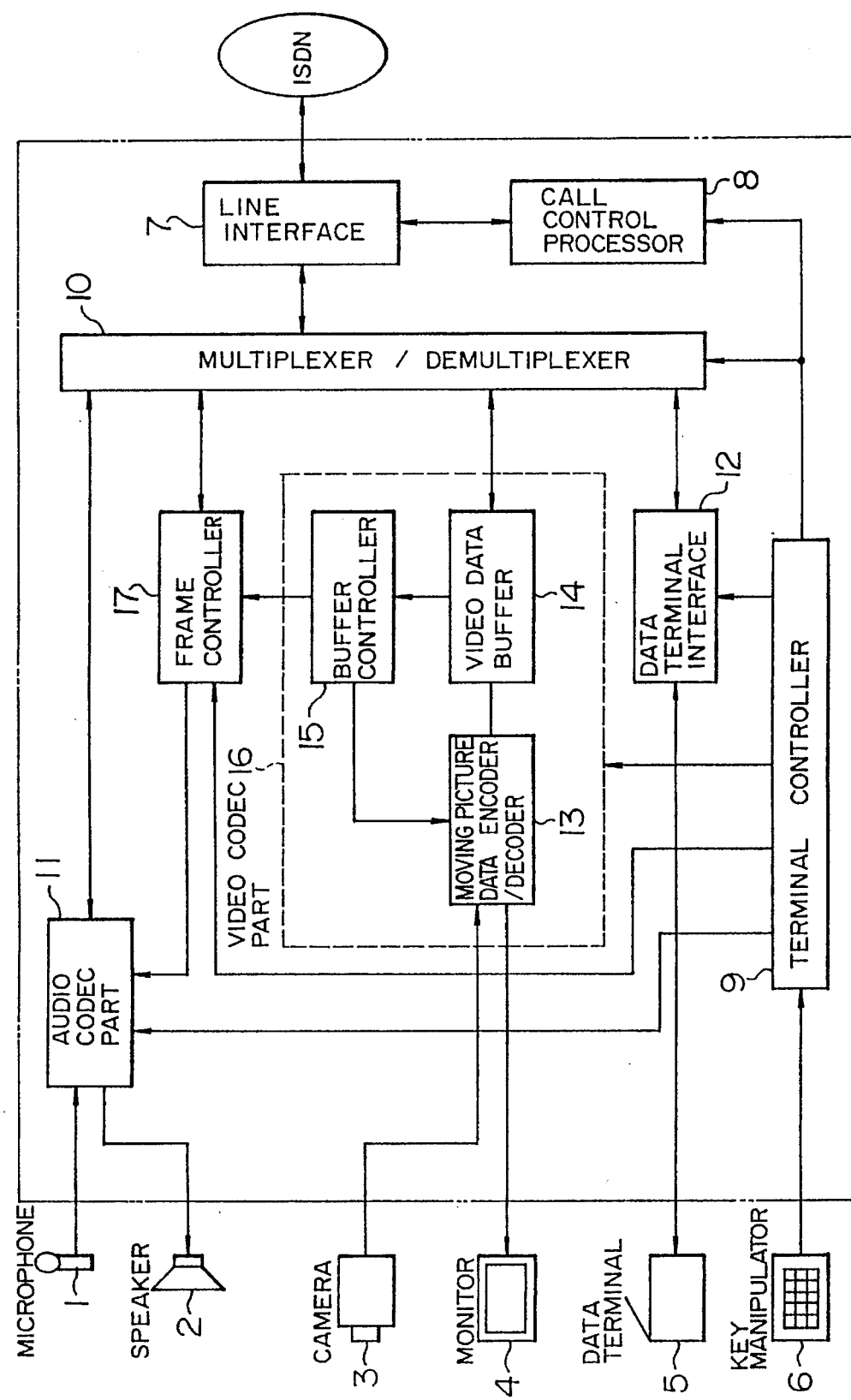
FIG. 1 is a functional block diagram of an embodiment of the multi-media communication apparatus according to the present invention.

Preferred embodiments of the multi-media communication apparatus according to the present invention will now be described by reference to the drawings. FIG. 1 is a functional block diagram of an embodiment of the multi-media communication apparatus of the present invention. Referring to FIG. 1, a microphone 1 receives audio information as its input, a speaker 2 generates audio information as its output, a camera 3 receives video information as its input, a monitor 4 generates video information as its output, and a data terminal 5 is used for file transfer and inputting and outputting character information, etc. A key manipulator part 6 is manipulated for the purpose of, for example, change-over between a routine mode and a video priority mode. The routine mode refers to the case where the transmission, reception, communication modes, etc. of the multi-media communication apparatus are instructed, selected and changed and refers also to the case where video information is processed in the usual manner. On the other hand, the video priority mode refers to the case where video information is processed according to the present invention which minimizes undesirable deformation or distortion of video data. A line interface part 7 controls connection of the multi-media communication apparatus to a communication line through an ISDN (integrated services digital network) and controls also communication by the multi-media communication apparatus. A call control/processing part 8 carries out call management including controlling and cutting outgoing and incoming calls.

A terminal control part 9 controls the multi-media communication apparatus on the basis of the input from the key manipulator part 6. A multiplexing/demultiplexing part 10 multiplexes signals including an audio signal, a video signal and a character signal to transmit the multiplexed signal to the communication line through the line interface part 7 and demultiplexes or separates a signal received through the line interface part 7 into signals including an audio signal, a video signal and a character signal. An audio codec part 11 compresses or encodes audio information inputted from the microphone 1 into an audio signal according to a predetermined encoding scheme to transmit the audio signal with an instructed communication rate. On the other hand, the audio codec part 11 expands or decodes an encoded audio signal received from the multiplexing/demultiplexing part 10 to supply the decoded audio signal to the speaker 2 as its output. A data terminal interface part 12 controls transmission and reception of a character signal between the data terminal 5 and the multiplexing/demultiplexing part 10.

A moving picture data encoding/decoding part 13 compresses or encodes video information inputted from the camera 3 according to a predetermined encoding scheme into a video signal to transmit the video signal with an instructed communication rate and also expands or decodes an encoded video signal received from the multiplexing/demultiplexing part 10 to supply the decoded video signal to the monitor 4 as its output. A video data buffer 14 temporarily stores the video signal compressed in the moving picture data encoding/decoding part 13 and the video signal separated in the multiplexing/demultiplexing part 10 to transmit the video signal compressed in the moving picture data encoding/decoding part 13 to the multiplexing/demultiplexing part 10 and to transmit the video signal separated in the multiplexing/demultiplexing part 10 to the moving picture data encoding/decoding part 13. A buffer control part 15 detects the quantity of the compressed video signal stored in a transmission memory of the video data buffer 14 and instructs the moving picture data encoding/decoding part 13 to change the compression scheme on the basis of the detected quantity of the compressed video signal. The moving picture data encoding/decoding part 13, the video data buffer 14 and the buffer control part 15 constitute a video codec part 16. A frame control part 17 informs the multiplexing/demultiplexing part 10 and the audio codec part 11 to change the frame structure and the audio encoding scheme according to the quantity of the video signal stored in the video data buffer 14 and detected by the buffer control part 15.

Figure 2A:
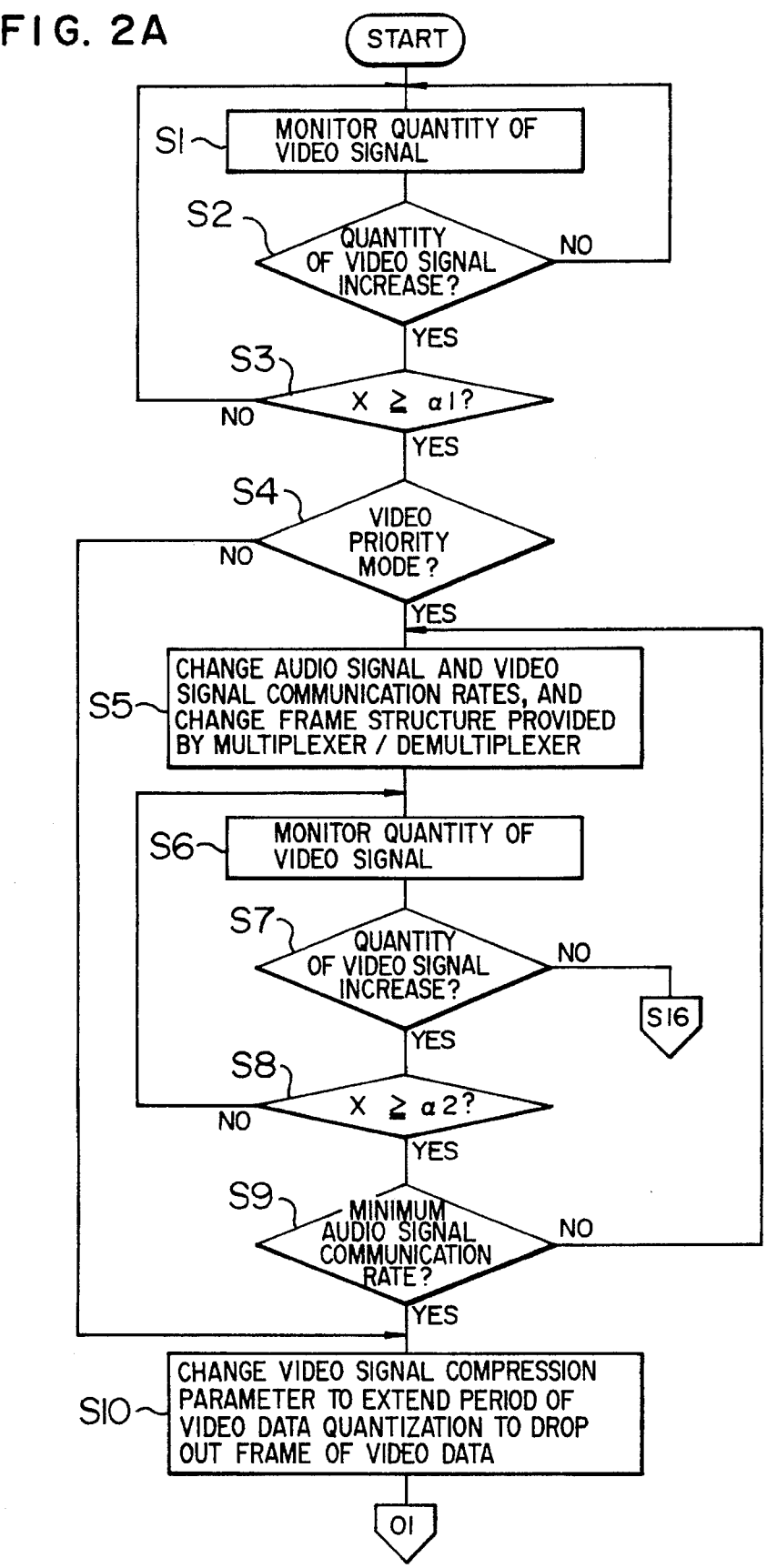
FIGS. 2A, 2B and 2C are flow charts of the operation of the embodiment of the multi-media communication apparatus of the present invention shown in FIG. 1.
Figure 2B:
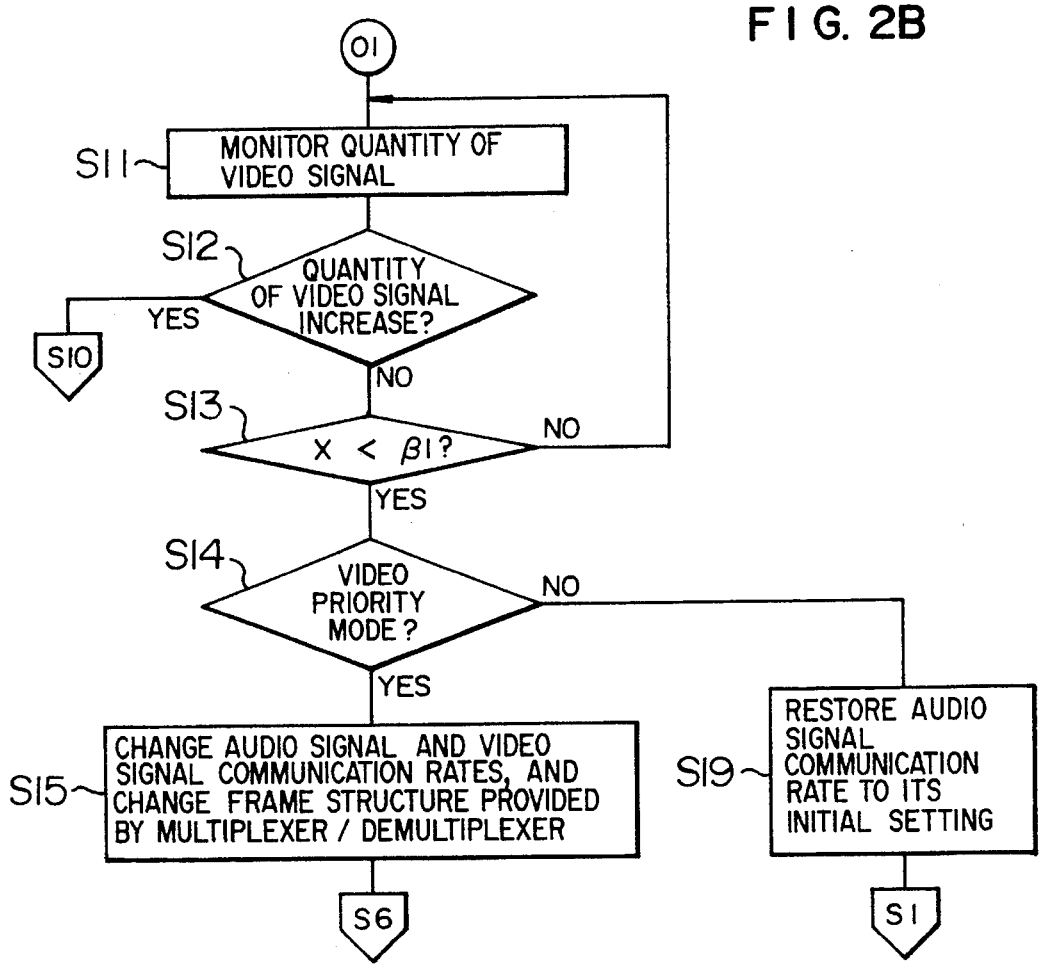
Figure 2C:
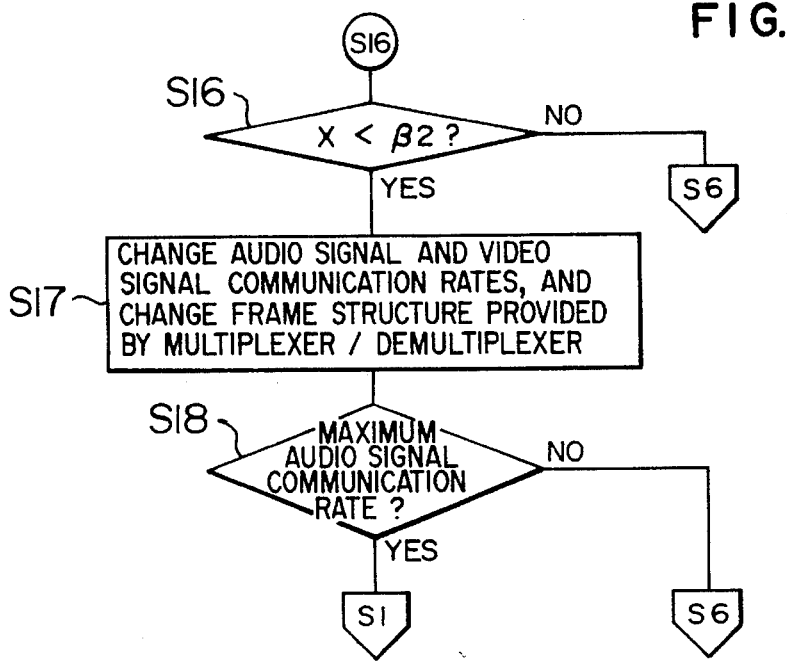

The operation of the multi-media communication apparatus embodying the present invention will now be described by reference to the drawings. FIGS. 2A, 2B and 2C are flow charts of operation of the multi-media communication apparatus embodying the present invention. In the following description, it is supposed that the multi-media communication apparatus embodying the present invention is connected to an ISDN to make communication over two B channels, and the audio codec part 11 exhibits a companding function and uses any one of a plurality of encoding schemes, for example, an encoding scheme for 16 kbps as defined in the paragraph G. 728 of the CCITT recommendations, and encoding schemes for 48 kbps and 56 kbps as defined in the paragraph G. 722 of the CCITT recommendations. The description will proceed by reference to the case where the manner of communication by the multi-media communication apparatus includes the steps of first selecting the telephone number of another multi-media communication apparatus to be connected, manipulating the telephone number dialing keys on the key manipulator part 6 to connect the multi-media communication apparatus to the selected multi-media communication apparatus by the function of the call control/processing part 8 which acts to connect the former apparatus and the latter apparatus to the communication line through the line interface part 7, and inputting the audio communication rate on the key manipulator part 6 according to the paragraph H. 221 of the CCITT recommendations. The description will further proceed by reference to the case where, on the basis of the inputted communication rate, the multiplexing/demultiplexing part 10 determines the communication channel allocation scheme and the frame structure of information including audio information, video information and character information, and, according to the BAS code defined in the paragraph H. 241 of the CCITT recommendations, the exchange of the frame structures and the capacities of the former and latter apparatuses is made through the line interface part 7 together with the instruction of the communication mode, etc., so as to attain the multi-media communication of information including audio information, video information and character information between the former and latter apparatuses.

It is supposed herein that the audio signal communication rate is set at 56 kbps. In this case, the multiplexing/demultiplexing part 10 provides a frame structure as shown in FIG. 3, and the audio signal and the video signal are allocated as shown. It will be seen in FIGS. 3A and 3B that the audio signal occupies a region from a 1st subchannel to an 80th octet of a 7th subchannel of a 1st channel. An FAS code (frame alignment signal) occupies a region of 8 bits of an 8th subchannel of the 1st channel and 8 bits of an 8th subchannel of a 2nd channel. The BAS code occupies 8 bits following the FAS code in the 8th subchannel of the 1st channel and 8 bits following the FAS code in the 8th subchannel of the 2nd channel. A region of from a 17th octet to an 80th octet of the 8th subchannel of the 1st channel and a region of the 2nd channel except the region of the FAS code and the region of the BAS code are allocated to the video signal. Unless the audio signal communication rate is changed, neither the illustrated frame structure nor the video signal communication rate is changed.

The operation of the multi-media communication apparatus embodying the present invention will now be described by reference to flow charts of FIGS. 2A, 2B and 2C. In a first step S1, the buffer control part 15 monitors the quantity X of a video signal compressed for the purpose of transmission and stored in the video data buffer 14. In a step S2, the buffer control part 15 decides whether or not the quantity X of the video signal increases or decreases. When the buffer control part 15 decides that the quantity X of the video signal increases, the step S2 is followed by a step S3, while when the buffer control part 15 decides that the quantity X of the video signal decreases, the step S2 is followed by the step S1. In the step S3, on the basis of the video signal quantity information supplied from the buffer control part 15, the frame control part 17 decides whether or not the quantity X of the video signal exceeds a predetermined threshold $\alpha 1$. When the result of decision proves that $X<\alpha 1$, the step S3 is followed by the step S1, while when the result of decision proves that $X \geq 1$, the step S3 is followed by a step S4. In the step S4, the frame control part 17 decides whether or not the video priority mode is set. When the video priority mode is not yet set, the step S4 is followed by a step S10, while when the video priority mode is already set, the step S4 is followed by the step S5. In the step S5, the frame control part 17 instructs the multiplexing/demultiplexing part 10 to change the audio signal communication rate to that slower by one rank than the present communication rate and to change the frame structure to that in which the decrement is added to the video signal communication rate. However, in this case, the frame control part 17 does not instruct to change the communication rate based on the encoding scheme which the audio codec part 11 does not possess. For example, when the present audio signal communication rate is set at 56 kbps, the frame control part 17 decides the audio signal communication rate to be 48 kbps and instructs the multiplexing/demultiplexing part 10 to adopt the transmitted audio signal compression scheme according to the paragraph G. 722 of the CCITT recommendations. That is, the frame control part 17 instructs the multiplexing/demultiplexing part 10 to use the frame structure conforming to the audio signal communication rate of 48 kbps. According to the instructions from the frame control part 17, the audio codec part 11 and the multiplexing/demultiplexing part 10 change the audio signal encoding scheme and the frame structure respectively.

In this case, the multiplexing/demultiplexing part 10 provides the frame structure as shown in FIGS. 4A and 4B. It will be seen that the audio signal occupies a region of from the 1st subchannel to an 80th octet of a 6th subchannel of the 1st channel. The FAS code occupies 8 bits in the 8th subchannel of the 1st channel and 8 bits in the 8th subchannel of the 2nd channel. The BAS code occupies 8 bits following the FAS code in the 8th subchannel of the 1st channel and 8 bits following the FAS code in the 8th subchannel of the 2nd channel. The video signal is allocated to a region of from the 7th subchannel to the 80th octet of the 8th subchannel of the 1st channel and a region of the 1st channel except the region of the FAS code and the region of the BAS code and a region of the 2nd channel except the region of the FAS code and the region of the BAS code. Thus, although the region of the audio signal decreases, the audio signal communication is not interrupted, and the region of the video signal increases, so that the communication can be continued while minimizing occurrence of undesirable frame dropout of video data and block distortion.

In the step S6, the buffer control part 15 monitors the quantity X of the compressed video signal stored in the video data buffer 14 to be transmitted. In a step S7, the buffer control part 15 decides whether the quantity X of the video signal increases or decreases. When the result of decision proves that the quantity X of the video signal increases, the step S7 is followed by a step S8, while when the result of decision proves that the quantity X of the video signal decreases, the step S7 is followed by a step S16. In the step S8, the frame control part 17 decides whether or not the quantity X of the video signal exceeds a predetermined threshold $\alpha 2$. When the result of decision proves that $X<\alpha 2$, the step S8 is followed by the step S6, while when the result of decision proves that $X \geq \alpha 2$, the step S8 is followed by a step S9. In the step S9, the frame control part 17 decides whether or not the audio signal communication rate is minimum. In the illustrated embodiment, the step S9 is followed by a step S10 when the audio signal communication rate is 16 kbps (minimum), while when the communication rate is 48 kbps, the step S9 is followed by the step S5 in which the audio signal communication rate is changed to 16 kbps.

FIGS. 5A and 5B schematically show the frame structure when the audio signal communication rate is 16 kbps. In the step S10, as in the case of the prior art method for video signal processing, the buffer control part 15 instructs the moving picture data encoding/decoding part 13 to change the compression parameter so as to extend the period of video data quantization in the quantizing step thereby decreasing the number of frames of video data. In the manner described above, the quantity of the video signal supplied from the moving picture data encoding/decoding part 13 to the video data buffer 14 is controlled so that it may not exceed the capacity of the video data buffer 14. Thus, the video signal would never be lost even when the video signal is transmitted at the minimum communication rate of the audio signal.

In a step S11, the buffer control part 15 monitors the quantity X of the compressed video signal stored in the video data buffer 14 to be transmitted. In a step S12, the buffer control part 15 decides whether the quantity X of the video signal increases or decreases. When the quantity X of the video signal is proved to increase, the step S12 is followed by the step S10, while when the quantity X of the video signal is proved to decrease, the step S12 is followed by a step S13. In the step S13, the frame control part 17 decides whether or not the quantity X of the video signal is less than a predetermined threshold $\beta 1$. When the result of decision proves that $X \geq \beta 1$, the step S13 is followed by the step S11, while when the result of decision proves that $X<\beta 1$, the step S13 is followed by a step S14. In the step S14, the frame control part 17 decides whether or not the video priority mode is set. When the video priority mode is not yet set, the step S14 is followed by a step S19, while when the video priority mode is already set, the step S14 is followed by a step S15. In the step S15, the frame control part 17 instructs the moving picture data encoding/decoding part 13 to change the compression parameter to its initial value, instructs the audio codec part 11 to change the compression scheme to the encoding scheme of 16 kbps again, and instructs the multiplexing/demultiplexing part 10 to change the frame structure to that conforming to the audio signal communication rate of 16 kbps. Then, the step S15 is followed by the step S6.

In the step S16, the frame control part 17 decides whether or not the quantity X of the video signal is less than a predetermined threshold $\beta2$. When the result of decision proves that $X \geq \beta2$, the step S16 is followed by the step S6, while when the result of decision proves that $X < \beta2$, the step S16 is followed by a step S17. In the step S17, the frame control part 17 instructs the audio codec part 13 to change the audio signal communication rate to that higher by one rank from the present communication rate. For example, when the present audio signal communication rate is 16 kbps, the frame control part 17 instructs the audio codec part 13 to change the compression scheme to the encoding scheme of 48 kbps again, and instructs the multiplexing/demultiplexing part 10 to restore the frame structure conforming to the audio communication rate of 48 kbps. Then, the step S17 is followed by a step S18. In the step S18, the frame control part 17 decides whether or not the value of the audio signal communication rate is maximum. In the illustrated embodiment, the frame control part 17 decides whether or not the value of the audio signal communication rate is 56 kbps. When the value of the audio signal communication rate is proved to be its maximum, the step S18 is followed by the step S1, while when the decided value of the communication rate is not the maximum, the step S18 is followed by the step S6.

In the step S19, the frame control part 17 instructs the moving picture data encoding/decoding part 13 to change the compression parameter to its initial value, instructs the audio codec part 11 to change the compression scheme to its initially set one and instructs similarly the multiplexing/demultiplexing part 10 to change the frame structure to its initially set one. That is, the audio codec part 11 changes the compression scheme to the encoding scheme of 56 kbps defined in the paragraph G. 711 of the CCITT recommendations again, and the multiplexing/demultiplexing part 10 changes the frame structure to that shown in FIGS. 3A and 3B. Then, the step S19 is followed by the step S1.

It will be understood from the foregoing description that, even when the quantity of the video signal becomes large, the audio signal communication rate is lowered, so that the desired multi-media communication can be achieved without interruption of the audio signal communication and while minimizing occurrence of undesirable frame drop-out of video data and an undesirable increase in block distortion.

It is apparent that the present invention can be put into practice in various forms without departing from the spirit or its principal features. Therefore, the embodiment described above is merely illustrative in every aspect and must not be imitatively interpreted. The scope of the present invention is as defined in the scope of appended claims and is in no way limited by the description of the specification. Also, various changes and modifications that belong to the scope of the claims are all included in the scope of the present invention.

What is claimed is:

1. A multi-media communication apparatus comprising:
   line interface means for controlling communication through a communication line;
   call control/processing means for controlling calls incoming and outgoing through said line interface means;
   multiplexing means for multiplexing video information and audio information to transmit the multiplexed information through said line interface means;
   audio codec means for encoding an audio signal to transmit the encoded audio signal to said multiplexing means;
   moving picture data encoding means for encoding a video signal;
   video data buffer means for temporarily storing the video signal compressed in said moving picture data encoding means to transmit the compressed video signal to said multiplexing means;
   buffer control means for detecting the quantity of the compressed video signal stored in a memory of said video data buffer means and controlling the video signal compression scheme in said moving picture data encoding means; and
   frame control means for detecting the quantity of the video signal stored in said video data buffer means on the basis of the information supplied from said buffer control means, said frame control means acting, when the quantity of the stored video signal exceeds a predetermined threshold, (a) to decrease the value of the audio signal communication rate to that of a predetermined non-zero rate and (b) to change over the audio signal compression scheme in said audio codec means to that based on the value of said predetermined non-zero rate, thereby changing over the channel allocation scheme in said multiplexing means to allocate less channels to the audio signal and to allocate more channels to the video signal, said communication rate of the audio signal including levels of 56 kbps, 48 kbps and 16 kbps which are set when a channel of said communication line is allocated to the audio signal, and the audio signal being encoded in accordance with an encoding scheme for one of said communication rates of 16, 48 and 56 kbps.

2. A multi-media communication apparatus according to claim 1, further comprising mode switching means for changing over between a routine mode and a video priority mode, said video priority mode being one in which said video signal is processed to minimize deformation or distortion of video data.

3. A multi-media communication apparatus according to claim 2, wherein said frame control means acts to perform said operations (a) and (b) only when said mode switching means sets said communication apparatus into said video priority mode.

4. A multi-media communication apparatus according to claim 3, wherein, when said mode switching means sets said communication apparatus into said routine mode, said frame control means acts to change a video signal compression parameter of the compressed video signal in response to the detected quantity of the video signal exceeding said predetermined threshold.

5. A multi-media communication apparatus comprising:
   line interface means for controlling communication through a communication line;
   call control/processing means for controlling calls incoming and outgoing through said line interface means;
   multiplexing means for multiplexing video information and audio information to transmit the multiplexed information through said line interface means;
   audio codec means for encoding an audio signal to transmit the encoded audio signal to said multiplexing means;

moving picture data encoding means for encoding a video signal;

video data buffer means for temporarily storing the video signal compressed in said moving picture data encoding means to transmit the stored video signal to said multiplexing means;

buffer control means for detecting the quantity of the video signal stored in a memory of said video data buffer means and controlling the video signal compression scheme in said moving picture data encoding means; and frame control means for detecting the quantity of the video signal stored in said video data buffer means on the basis of information supplied from said buffer control means, said frame control means acting, when the detected quantity of the video signal exceeds a predetermined threshold, (a) to decrease the value of the audio signal communication rate to that of a predetermined non-zero rate and (b) to change over the audio signal compression scheme in said audio codec means to that based on said predetermined non-zero rate, thereby changing over the channel allocation scheme in said multiplexing means to allocate less channels to the audio signal and to allocate more channels to the video signal, said frame control means acting, when on the other hand the audio signal communication rate is at a predetermined minimum non-zero threshold and the detected quantity of the video signal exceeds a predetermined threshold, (c) to instruct said buffer control means to change the video signal compression parameter in said moving picture data encoding means, thereby extending the period of video data quantization in the quantizing step and decreasing the number of frames of the video signal, said communication rate of the audio signal including levels of 56 kbps, 48 kbps and 16 kbps which are set when a channel of said communication line is allocated to the audio signal, and the audio signal being encoded in accordance with an encoding for one of said communication rates of 16, 48 and 56 kbps.

6. A multi-media communication apparatus according to claim 5, further comprising mode switching means for changing over between a routine mode and a video priority mode, said video priority mode being one in which said video signal is processed to minimize deformation or distortion of video data.

7. A multi-media communication apparatus according to claim 6, wherein said frame control means acts to perform said operations and (a), (b) and (c) only when said mode switching means sets said communication apparatus into said video priority mode.

8. A multi-media communication apparatus according to claim 7, wherein, when said mode switching means sets said communication apparatus into said routine mode, said frame control means acts to change a video signal compression parameter of the compressed video signal in response to the detected quantity of the video signal exceeding said predetermined threshold.

9. A multi-media communication apparatus comprising:

line interface means for controlling communication through a communication line;

call control/processing means for controlling calls incoming and outgoing through said line interface means;

multiplexing means for multiplexing video information and audio information to transmit the multiplexed information through said line interface means;

audio codec means for encoding an audio signal to transmit the encoded audio signal to said multiplexing means;

video codec means for encoding a video signal to transmit the encoded video signal to said multiplexing means;

frame control means for increasing the rate of audio signal compression in said audio codec means when the quantity of the video signal exceeds a predetermined threshold, said increasing of said rate of audio signal compression being limited so as to maintain an audio signal communication rate above a predetermined non-zero threshold, thereby controlling the channel allocation scheme in said multiplexing means to allocate less channels to the audio signal and to allocate more channels to the video signal; and mode switching means for changing over between a routine mode and a video priority mode, said video priority mode being one in which said video signal is processed to minimize deformation or distortion of video data.

10. A multi-media communication apparatus according to claim 9, wherein said frame control means acts to increase said rate of audio signal compression only when said mode switching means sets said communication apparatus into said video priority mode.

11. A multi-media communication apparatus according to claim 10, wherein, when said mode switching means sets said communication apparatus into said routine mode, said frame control means acts to change a video signal compression parameter of the compressed video signal in response to the detected quantity of the video signal exceeding said predetermined threshold.

* * * * *